Oct. 24, 1944.  H. W. ROGERS  2,361,241
FRUIT PARING AND CUTTING MECHANISM
Filed Feb. 5, 1944   2 Sheets-Sheet 1
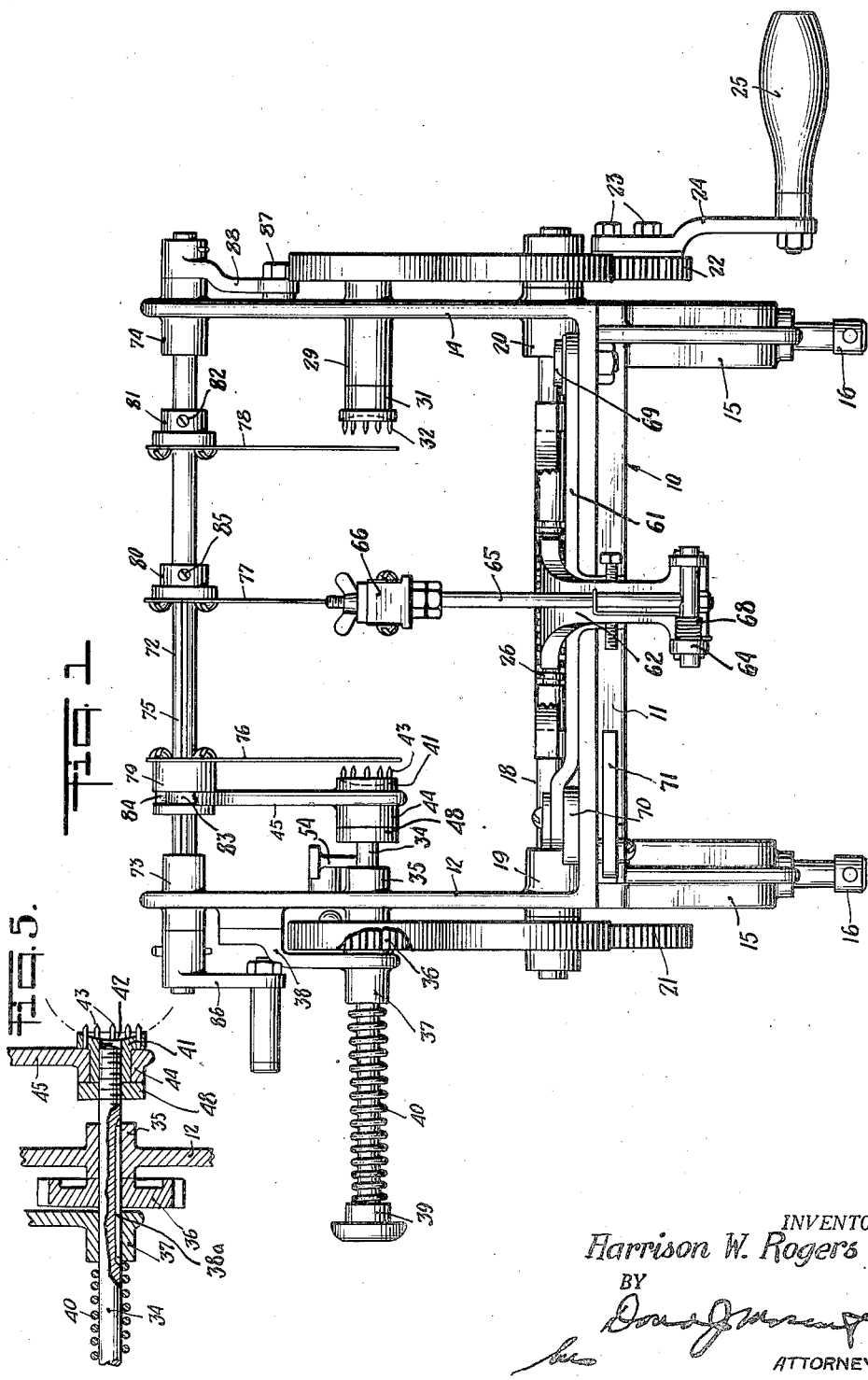
INVENTOR.
Harrison W. Rogers
BY
ATTORNEY Oct. 24, 1944.  H. W. ROGERS  2,361,241
FRUIT PARING AND CUTTING MECHANISM
Filed Feb. 5, 1944   2 Sheets-Sheet 2
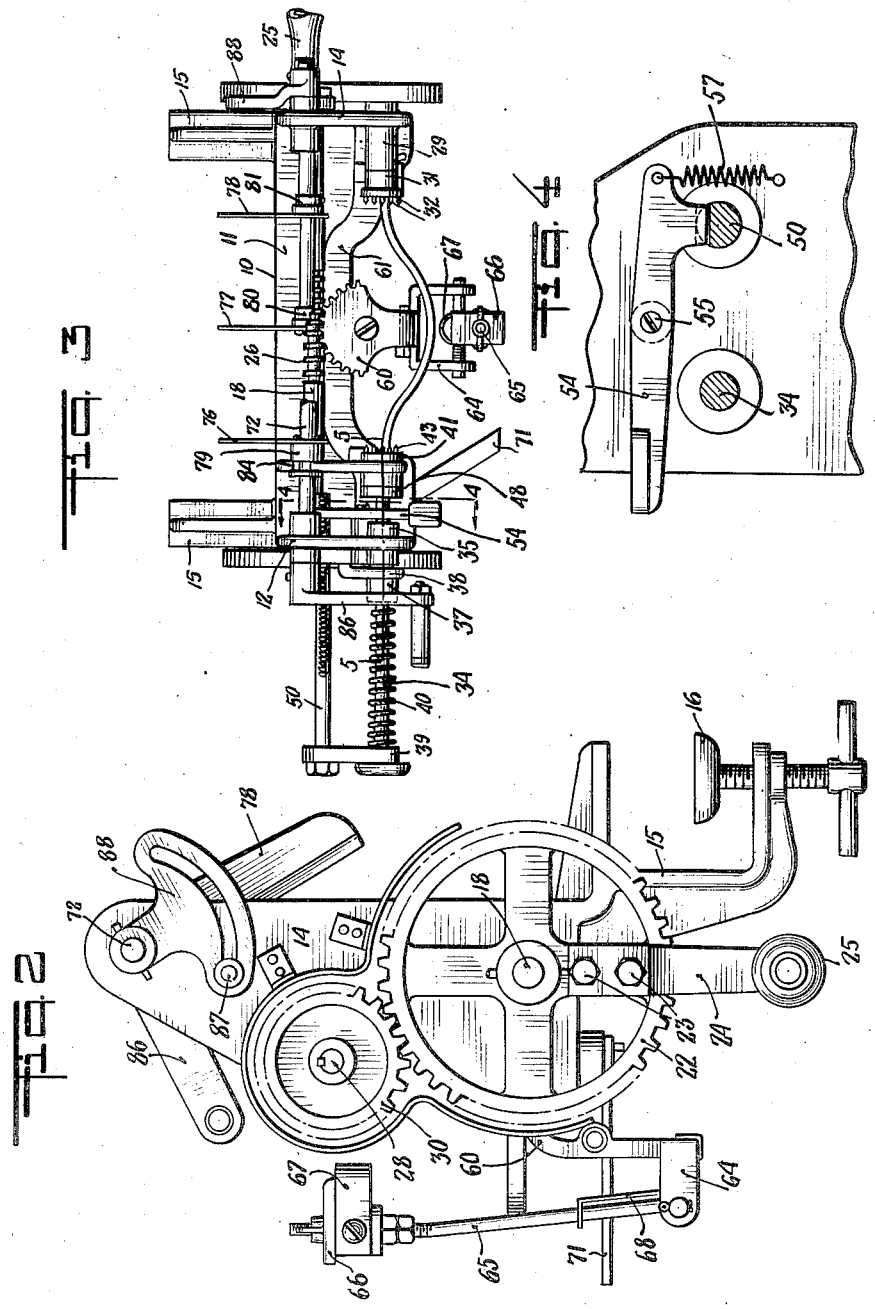
INVENTOR.
Harrison W. Rogers
BY
ATTORNEY Patented Oct. 24, 1944

2,361,241

UNITED STATES PATENT OFFICE 2,361,241

FRUIT PARING AND CUTTING MECHANISM

Harrison W. Rogers, Miami, Fla.

Application February 5, 1944, Serial No. 521,261

6 Claims. (Cl. 146—3)

This invention relates to fruit paring apparatus, and is more specifically directed to improvements in portable units for paring citrus fruit, adapted for hand operation.

Fruit paring machines of this character usually comprise means for holding and rotating the fruit while a swinging knife is operated to remove the body rind, certain of said machines also embodying devices for severing the button or polar ends of the fruit, so as to remove all of the contaminated skin thereof. None of such machines, however, contemplate means for cutting the fruit into halves, as required when the fruit is to be subjected to squeezing for juice extraction, with the result that a further operation has to be separately performed by hand, and the fruit, after removal of the skin, is again subjected to hand manipulation with obvious disadvantages from a sanitary standpoint.

It is therefore the general object of this invention to provide a paring machine for citrus fruit, such as oranges and grapefruits, which besides embodying means for removing the body rind and thereafter severing the button ends of the fruit, also incorporates means for cutting the fruit into halves, whereby the fruit is delivered in proper condition for squeezing and juice extraction by wholly mechanical operation, and need not be subjected to the contact of the hands after it has been placed in the paring machine with its skin intact.

Further, the invention aims at providing a paring unit embodying the aforementioned means, which is of simple and relatively inexpensive manufacture, which is adapted to be mounted on a bench or table and to be hand operated, and wherein the severing of the polar ends of the fruit and the cutting of this latter into halves are effected simultaneously in a single operation.

Another object of the invention consists in the provision of adjustable means whereby the fruit may be cut exactly into halves regardless of its size, and also in the provision of a novel and improved arrangement and construction of the means for holding and rotating the fruit and for severing the polar ends thereof.

These and other objects of the invention will become apparent in the following description of a preferred embodiment thereof illustrated in the drawings, wherein—

Figure 1 is a front view, in elevation, of the machine according to the invention.

Figure 2 is a right end view, in elevation, of the apparatus of Figure 1.

Figure 3 is a top plan view of the machine, part of the structure being broken off to show the mechanism arranged thereunder.

Figure 4 is an enlarged fragmentary cross-sectional view, on line 4—4 of Figure 3 in the direction of the arrows.

Figure 5 is a fragmentary vertical section through the machine, on line 5—5 of Figure 3.

Referring now in detail to the drawings wherein like characters of reference are employed to designate the similar parts in the various views, numeral 10 generally indicates the frame of the machine, which comprises a base 11, two spaced parallel upstanding members or standard 12 and 14, and a pair of brackets 15 extending from the base and carrying cooperating clamp members 16 for securing the machine to a bench or a table.

A shaft 18 is journaled at 19 and 20 in the standards 12, 14, adjacent base 11 and parallel thereto, and carries gears 21 and 22 of equal diameter, which are fastened to the shaft exteriorly of the standards, gear 22 having secured thereto, as by means of bolts 23, a lever 24 provided with a handle 25 for rotating the shaft and operating the machine. Shaft 18 also has, intermediate its ends, a worm 26 for actuating the paring mechanism, as it will hereafter be described.

A shaft 28 is mounted in a bearing 29, integral with standard 14, parallel to and above said shaft 18, and carries at one end thereof a gear 30, which is keyed to the shaft and is in constant mesh with gear 22, the inner end of shaft 28 having fastened thereto a chuck 31. This chuck has a lateral concave surface (as shown in dotted lines in Figure 1) conforming with the curved surface of the fruit to be pared, and provided with circumferentially arranged projecting teeth or pins 32 that are of sufficient length to firmly engage the fruit without entirely perforating its skin.

A shaft 34 is mounted, in axial alinement with shaft 28, in a bearing 35 integral with standard 12, for rotation therein and longitudinal sliding movement relative thereto, the shaft extending outwardly from said standard. A gear 36, identical in diameter to gear 30, is mounted on shaft 34 and meshes with gear 21, so that shafts 28 and 34 may be simultaneously rotated at the same speed. Gear 36 is mounted in lateral abutment with the bearing 35 and a bearing 37, formed at the lower end of a bracket 38 suitably secured to the standard 12, and is therefore maintained in a fixed position relative to gear 21 so as to be constantly in mesh therewith regardless of the longitudinal displacement of shaft 34, a key-keyway arrangement being provided, as indicated at 38a in Figure 5, to permit conjoint rotation of gear 36 and shaft 34 and longitudinal movement of this latter relative to the gear. At the outer end of shaft 34, adjacent the knob-shaped terminal portion thereof, there is freely mounted a member 39, the purpose whereof will become hereafter apparent, a spring 40, interposed between said member 39 and bearing 37, maintaining the shaft 34 in its outermost position, as shown in Figure 1.

The threaded inner end of the shaft 34 carries a chuck 41 which, similarly to chuck 31, has a concave lateral surface 42 and circumferentially arranged projecting pins 43; the hub-shaped lower end of an arm 45 (which has a fork-shaped upper end as it will hereafter be more fully described) is freely mounted on chuck 41 in lateral abutment against confining surfaces formed by the rim of the chuck and a collar 48 mounted on the threaded portion of shaft 34 (see Figure 5), whereby said arm 45 is movable with the chuck during axial displacement of the shaft. A notched shaft or ratchet 50, slidably mounted in standard 12, extends parallel to and in the same plane of shaft 34, the aforementioned member 39, which is fastened at one end thereof to shaft 50, interconnecting shafts 34 and 50 for conjoint longitudinal movement. A lever 54 is pivotally connected, at 55, to the standard 12 and is provided with a pawl 56 which is normally maintained in engagement with the notched shaft by a spring 57.

As it will be apparent from the foregoing, the chuck 41 can be adjusted relative to the chuck 31 by pushing the shaft 34 inwardly in opposition to the spring 40, and can be locked in its adjusted position by the ratchet and pawl device described, the length of the shaft being such as to permit of a wide range of adjustments, to accommodate and support between the chucks fruits of greatly differing diameters.

For removing the skin from the body of the fruit held by the rotatable chucks, any suitable paring mechanism of a type known in the art may be employed, such as, for instance, the mechanism disclosed in the U. S. Patent No. 1,956,492 to Douglas E. China. Since this part of the machine does not form an object of the present invention, it will be described only insofar as necessary for a complete understanding of the operation of the machine. Briefly, the mechanism comprises an angular member having a gear segment 60 and pivotally supported for movement in a horizontal plane on a swingable member 61, which is normally maintained, by means of a suitable spring (not shown), in such a position as to insure meshing of gear segment 60 with worm 26 of shaft 18, as in the showing of Figure 3. The downwardly extending portion 62 of said angular member carries a bracket 64 which pivotally supports an upstanding arm 65; this arm carries, at its upper end, a block 66 which incorporates a circular knife 67, resiliently maintained in contact with the fruit to be peeled by a spring 68 that urges the arm toward the fruit supported between the chucks.

The rotation of the driving gear 22 causes rotation of the shaft 18 and, through worm 26 and gear segment 60, determines a swinging movement of arm 65 and knife 67 in resilient engagement with the surface of the fruit (which is concurrently rotated by the chucks) and removal of the body rind therefrom. The member 61 is pivoted at one end thereof, as at 69, and, upon completion of the paring operation, is swung about its pivot by operating a lever 71 which actuates suitable cam means generally indicated at 70, to move the gear segment 60 out of mesh with the worm 26 and permit return of the knife-carrying arm 65 to its initial position under the action of spring means (not shown).

For simultaneously cutting the fruit into halves and severing the button ends thereof, there is provided the following mechanism.

A rocking shaft 72 is journaled at 73, 74 in the upper end of the standards 12, 14 and is splined along part of its length, as indicated at 75. Downwardly extending knives 76, 77, 78 are suitably secured to collars 79, 80, 81, respectively, the collars being mounted on shaft 72 and being rockable therewith to bring the knives into engagement with the fruit. Collar 81 is fastened to the shaft 72 as by means of a set screw 82, with its knife 78 extending in a vertical plane adjacent chuck 31, so as to cooperate with said chuck in severing one of the button ends of the fruit. The knife 76, however, which will function to sever the button end of the fruot engaged by the longitudinally adjustable chuck 41, besides being rockable with the shaft 73 must also be movable together with chuck 41, to remain in fixed laterally spaced relation to the chuck regardless of the longitudinal displacement of this latter. For this purpose, the collar 79 carrying the knife 76 is freely mounted on the splined portion of the shaft 72, and is grooved, as at 83, to receive the forked upper end 84 of the aforementioned arm 45, the lower end whereof is associated with the chuck 41 in the manner hereinbefore described.

Collar 80, which carries the intermediate knife 77 for cutting through the center of the fruit is adjustably fastened to the shaft 72 as by means of a set screw 85, so that the knife may be constantly maintained in a central position relative to the other knives and the chucks, to insure cutting of the fruit into exact halves irrespective of the size of the fruit.

A crank 86, secured at one end of the shaft 72, provides means for manually rocking the shaft and the knives associated therewith, while a stop 87 fastened to standard 14 cooperates with a slotted member 88, which is carried by the other end of the shaft, in defining the limit of the rocking movement of the shaft and the extreme positions of the knives.

As it will be evident from the foregoing description, the operation of the machine is as follows:

The orange or grapefruit is placed between the chucks and chuck 41 is adjusted by moving shaft 34 inwardly, in opposition to spring 40, as far as necessary to securely clamp the fruit between the chucks, and is then locked in its adjusted position by the ratchet and pawl arrangement described. Handle 25 is then operated to rotate the shaft 18, which in turn rotates the chucks and simultaneously actuates the paring mechanism. When the body rind has been removed, the segmental gear 60 is disengaged from worm 26 and the paring mechanism is rendered inoperative, whereupon shaft 18 is again rotated to revolve the fruit, and crank 86 is concurrently operated (after the intermediate knife 77 has been adjusted, if necessary) to rock the shaft 72 and to bring the three knives associated therewith into engagement with the fruit to sever the button ends thereof and simultaneously cut the fruit into halves. The shaft 34 is then released by acting on the pawl lever 54 to disengage the pawl from the notched shaft 50, spring 40 causes the chuck 41 to move away from the fruit, the two perfectly peeled halves of which will then fall into any suitably located receptacle, ready for transfer to a squeezer by means of a fork or the like.

While I have described my invention substantially with reference to a preferred embodiment thereof, it is to be understood that many changes and modifications may be made therein without departing from the spirit of the invention or exceeding the scope of the claims.

I claim:

1. In a fruit paring machine, in combination, a frame, a main shaft journaled in said frame, a pair of axially alined shafts rotatably mounted in the frame and driven from said main shaft, chucks carried by said axially alined shafts for revolubly holding a fruit to be pared, one of said shafts being longitudinally slidable toward and from the other, means for maintaining said slidable shaft in any desired position, a rocking shaft, a knife associated with said rocking shaft for rocking movement therewith and longitudinal movement relative thereto, means interconnecting said knife and said slidable shaft to cause the knife to move longitudinally together with the slidable shaft, a second knife associated with the rocking shaft and rockable therewith, a third knife carried by the rocking shaft intermediate the other knives and rockable with the shaft, said third knife being longitudinally adjustable relative to the other knives.

2. In a fruit paring machine, in combination, a frame, a main shaft journaled in said frame, a pair of axially alined shafts rotatably mounted in said frame and driven from said main shaft, chucks carried by said shafts for revolubly holding a fruit to be pared, one of said shafts being longitudinally slidable toward and from the other, a notched shaft slidably mounted in the frame and associated with said slidable shaft for longitudinal movement therewith, means for locking said notched shaft in any desired position, a rocking shaft, a knife associated with said rocking shaft for rocking movement therewith and longitudinal movement relative thereto, rigid means interconnecting said knife and the slidable shaft to cause the knife to move longitudinally conjointly with this latter, a second knife associated with the rocking shaft and rockable therewith, a third knife carried by the rocking shaft intermediate the other knives and rockable with the shaft, said third knife being longitudinally adjustable relative to the other knives, and means for actuating the rocking shaft.

3. In a fruit paring machine, in combination, a frame, a main shaft journaled in said frame, a pair of axially alined shafts rotatably mounted in the frame in parallel spaced relation to the main shaft and driven therefrom, chucks carried by the axially alined shafts at the opposite ends thereof for revolubly holding a fruit to be pared, one of said shafts being longitudinally slidable toward and from the other, a notched shaft slidably mounted in the frame and associated with said slidable shaft for longitudinal movement therewith, means for locking said notched shaft in any desired position, a rocking shaft mounted in the frame parallel to and above the other shafts, a knife associated with said rocking shaft for rocking movement therewith and longitudinal movement relative thereto, rigid means interconnecting said knife and the chuck carried by the slidable shaft to cause the knife to move longitudinally together with said chuck, a second knife fastened to the rocking shaft and rockable therewith, a third knife carried by the rocking shaft intermediate the other knives and rockable with the shaft, said third knife being longitudinally adjustable relative to the other knives, and means for actuating the rocking shaft.

4. In a fruit paring machine, in combination, a frame, a main shaft journaled in said frame, a pair of axially alined shafts rotatably mounted in the frame in spaced parallel relation to the main shaft and driven therefrom, chucks carried by the axially alined shafts at the opposite ends thereof for revolubly holding a fruit to be pared, one of said shafts being longitudinally slidable toward and from the other, a notched shaft slidably mounted in the frame and associated with said slidable shaft for longitudinal movement therewith, means for locking said notched shaft in any desired position, a rocking shaft mounted in the frame parallel to and above the other shafts, a knife associated with said rocking shaft for rocking movement in a vertical plane adjacent the chuck carried by the slidable shaft, said knife being longitudinally movable relative to the rocking shaft, rigid means interconnecting said knife and said chuck to cause the knife to move longitudinally in unchanging spaced relation to the chuck, a second knife associated with the rocking shaft and rockable therewith in a vertical plane adjacent the other chuck, a third knife carried by the rocking shaft intermediate the other knives and rockable with the shaft, said third knife being longitudinally adjustable relative to the other knives, and means for actuating the rocking shaft.

5. In a fruit paring machine, in combination, a frame, a main shaft journaled in said frame, a pair of axially alined shafts rotatably mounted in the frame in spaced parallel relation to the main shaft and driven therefrom, chucks carried by the axially alined shafts at the opposite ends thereof for revolubly holding a fruit to be pared, one of said shafts being longitudinally slidable toward and from the other, a notched shaft slidably mounted in the frame and associated with said slidable shaft for longitudinal movement therewith, means for locking said notched shaft in any desired position, a rocking shaft mounted in the frame parallel to and above the other shafts, a knife associated with said rocking shaft for rocking movement in a vertical plane adjacent the chuck carried by the slidable shaft, said knife being longitudinally movable relative to the rocking shaft, rigid means interconnecting said knife and said chuck to cause the knife to move longitudinally in unchanging spaced relation to the chuck, a second knife associated with the rocking shaft and rockable therewith in a vertical plane adjacent the other chuck, a third knife carried by the rocking shaft intermediate the other knives and rockable with the shaft, said third knife being longitudinally adjustable relative to the other knives, means for actuating the rocking shaft to cause the knives to engage the fruit held between the chucks to sever the button ends of the fruit and simultaneously cut the same into halves, and means for limiting the movement of the rocking shaft and the knives.

6. In a fruit paring machine, in combination, a frame, a main shaft journaled therein, a pair of axially alined shafts rotatably mounted in the frame in parallel spaced relation to the main shaft and driven therefrom, chucks carried at the opposite ends of said rotatable shafts for revolubly holding a fruit to be pared, one of said shafts being longitudinally movable relative to the other to adjust the distance between the chucks in accordance with the size of the fruit, resilient means for normally holding the chuck carried by the slidable shaft away from the other chuck, a notched shaft slidably mounted in the frame and associated with said slidable shaft for conjoint longitudinal movement therewith, means carried by the frame for locking the notched shaft in any desired position, a rocking shaft mounted in the frame parallel to and above the other shafts, a knife associated with said rocking shaft for rocking movement adjacent the chuck carried by the slidable shaft, said knife being longitudinally movable relative to the rocking shaft, a rigid arm interconnecting said knife and said chuck to cause the knife to move longitudinally in unchanging spaced relation to the chuck, a second knife associated with the rocking shaft and rockable therewith adjacent the other chuck, a third knife carried by the rocking shaft intermediate the other knives and rockable with the shaft, said third knife being longitudinally adjustable relative to the other knives, and means for actuating the rocking shaft to move the knives into engagement with the fruit held between the chucks to sever the button ends of the fruit and simultaneously cut the same into halves.

HARRISON W. ROGERS.